Figures 1, 2:
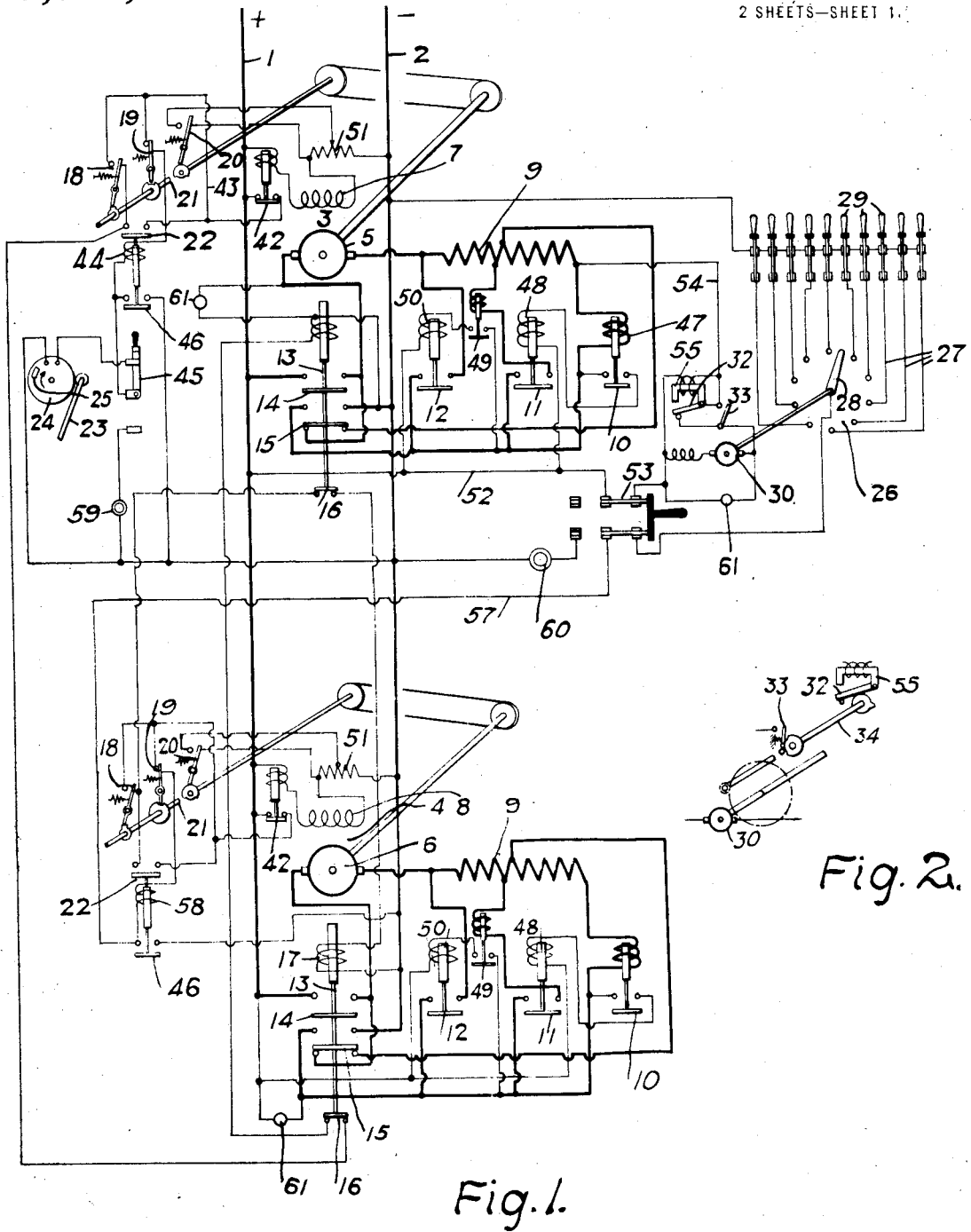

H. D. JAMES.
SYSTEM OF MOTOR CONTROL.
APPLICATION FILED APR. 4, 1916.

1,435,238.

Patented Nov. 14, 1922.
2 SHEETS—SHEET 1.

WITNESSES:

INVENTOR
Henry D. James.
BY
Wesley G. Carr
ATTORNEY

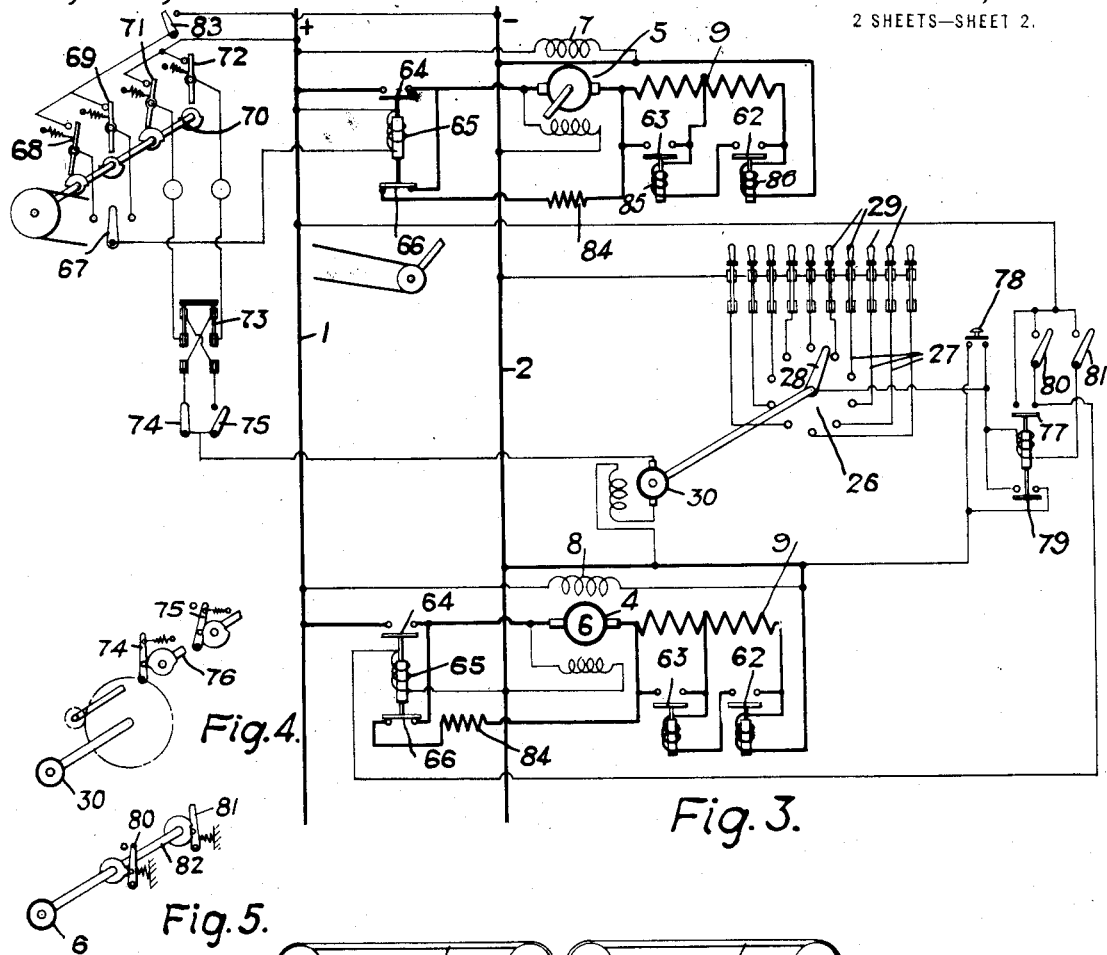

Patented Nov. 14, 1922.

UNITED STATES PATENT OFFICE.

HENRY D. JAMES, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF MOTOR CONTROL.

Application filed April 4, 1916. Serial No. 88,794.

*To all whom it may concern:*

Be it known that I, HENRY D. JAMES, a citizen of the United States, and a resident of Wilkinsburg, in the county of Allegheny and State of Pennsylvania, have invented a new and useful Improvement in Systems of Motor Control, of which the following is a specification.

My invention relates to systems of motor control and particularly to such systems as embody means for controlling the mechanism for charging blast furnaces.

My invention has for one of its objects to provide a simple means for selectively controlling the sequence of operation of a plurality of electric motors.

A second object of my invention is to provide an arrangement whereby the speed of an electric motor is automatically varied during a predetermined portion of its path of travel.

A further object of my invention is to provide a simple arrangement for effecting the operation of an electric motor through a definite cycle.

A blast furnace, as usually constructed, is provided with a charging chamber located at its top and having openings that are controlled by valve mechanisms termed "small bells" and "large bells". The small bell controls the upper opening of the charging chamber into which coke, limestone, ore, or other material may be discharged after it has been carried to this point by a skip hoist or other convenient means. The large bell controls the lower opening of the charging chamber and opens to admit the material that has accumulated in the charging chamber to the interior of the blast furnace.

In order to prevent the escape of gases while new material is being added to the contents of the furnace, but one of the bells is opened at a time. It is desirable, also, that the small bell be opened several times to admit the loads of the skip hoist into the charging chamber before the large bell is opened to permit the contents of the charging chamber to fall into the blast furnace.

It is the object of the present invention to provide a system that operates automatically to effect the operation of electric motors for controlling the small bells and large bells of blast furnaces in any desired predetermined order throughout a definite cycle. This cycle will be repeated automatically upon its completion. The operations of the motors for controlling the small bells are initiated either by the mechanism of the skip hoists or manually, as desired. Each motor comes to rest automatically when it has completed its respective cycle of operation.

Each operation of the motor for controlling the small bell effects the operation of a pilot motor for controlling what may be termed a sequence switch. The latter is provided with a number of stationary contact members, any desired number of which may be connected to a source of current. When the movable member of the sequence switch engages one of the stationary contact members that is connected in circuit, a switch is energized which effects the operation of the large bell motor when the small bell motor has come to rest. The controlling switches of the respective motors are suitably interlocked to prevent their simultaneous operation.

In the accompanying drawings, Fig. 1 is a diagrammatic view of circuits and apparatus embodying my invention. Fig. 2 is a diagrammatic view of the operating mechanism of certain of the switches of Fig. 1. Fig. 3 is a view, similar to Fig. 1, of a modification. Figs. 4 and 5 are diagrammatic views of the mechanisms for operating certain of the switches illustrated in Fig. 3. Fig. 6 is a view, partially in elevation and partially in section, of a portion of the charging mechanism of a blast furnace.

Referring particularly to Figs. 1 and 2, line conductors 1 and 2, which may be connected to any suitable source of direct current, supply energy to electric motors 3 and 4 having, respectively, armature windings 5 and 6 and shunt field-magnet windings 7 and 8. The motors 3 and 4 may be employed, respectively, to control the small bell and the large bell of a blast furnace top. Each of the motors is provided with a sectional starting resistor 9 that is controlled by a series of electromagnetically operable switches 10, 11 and 12. The circuit of each of the motors is controlled by an electromagnetically operable line switch 13 having switch members 14 and 15 that are mechanically connected. Each of the switch members 15 closes a dynamic braking circuit for the motor with which it is associated when the corresponding line switch 13 is in its open position.

Each of the line switches 13 is provided with an interlocking switch member 16 that is in circuit with the actuating coil 17 of the other line switch in order to prevent the simultaneous closing of the line switches. Switches 18, 19 and 20 are controlled by a cam mechanism 21 that is operatively connected to the armature shaft of the motor 3. The motor 4 is provided with a similar series of controlling switches that are actuated by similar mechanism.

The switch 19 controls the energizing circuit of an electromagnetic relay 22 which, in turn, controls the circuit of the actuating coil 17 of the line switch 13. The switch 18 controls a shunt for the actuating coil of the relay 22. The switch 20 controls a shunt circuit for a portion of the field resistor of the motor in order to increase the field excitation during a certain portion of the path of travel of the motor and thereby decrease the speed of the latter for a purpose to be later described.

The operations and functions of the switches 18, 19 and 20 that are operatively connected to the armature of the motor 4 correspond to those described in connection with the motor 3, and a detailed description thereof is accordingly omitted. The closing of the circuit of the motor 3 is effected by a mechanism operated by the skip hoist or other mechanism for conveying ore, coke, or other material to the top of the blast furnace. A rotatable shaft 23 is operatively connected to a rotatable disk 24 having a contact member 25 that momentarily completes the circuit of the actuating coil of the relay 22. The operation of the large-bell motor 4 is controlled by a sequence switch 26.

The sequence switch 26 comprises a series of stationary contact members 27 and a movable switch arm 28 that is arranged to successively engage the contact members 27. The circuits of the several contact members 27 are controlled by manually operable switches 29. The movable arm 28 is driven by a pilot motor 30, the circuit of which is completed during each operation of the small-bell motor 3. The circuit of the pilot motor 30 is controlled by switches 32 and 33 that are controlled by a cam mechanism 34 operatively connected to the motor 30.

Reference may now be had to Fig. 6 in which the charging mechanism of a blast furnace and the controlling motors therefor are diagrammatically illustrated in operative relation. The top of a blast furnace 35 is provided with a charging chamber 36 having openings controlled by a small bell 37 and a large bell 38 The motor 3 is operatively connected to the small bell 37 through a train of mechanism comprising a crank arm 39, a cable 40 and a hollow rod 41. The motor 4 is similarly connected to the large bell 38 by a crank arm 39 and a cable 40 which passes through the hollow rod 41.

It will be noted that, when the motors are in their illustrated positions, the bells are retained in their closed positions. The motors are operated through one complete revolution to successively open and close the bells. This movement is continuous but, as stated above, the speeds of the motors are decreased during the time the bells are in their approximately full open position.

It may be assumed that the motors are at rest and that the mechanisms controlled by them occupy their respective illustrated positions. It may be assumed, also, that the skip hoist mechanism (not shown), to which the shaft 23 may be operatively connected in any suitable manner, is in operation. When the rotatable disk 24, which rotates in a clockwise direction, effects the engagement of the contact segment 25 with its coacting stationary contact members, a circuit is completed which extends from line conductor 1 through field protective relay 42, conductor 43, switch 19, which is normally closed when the motor 3 is at rest, coil 44 of relay 22, manually operable switch 45 and contact segment 25 to line conductor 2. The coil 44 is energized by the circuit just described to effect the simultaneous closing of relay 22 and a switch 46 mechanically connected thereto that shunts the switch controlled by the revolving contact segment 25.

Current then traverses a circuit comprising line conductor 1, field protective relay 42, relay 22, interlock 16, coil 17 and line conductor 2. The coil 17 is energized to effect the closing of line switch 13 of the motor 3. The circuit of the motor extends from line conductor 2 through switch member 15, coil 47, resistor 9, armature 5 and switch member 14 to line conductor 1.

The switch 10 then closes to complete a circuit for the actuating coil 48 of the switch 11. The switch 11 closes to complete a shunt circuit for one section of the resistor 9. This shunt circuit comprises the actuating coil of a series relay switch 49, which closes to complete a circuit for the actuating coil 50 of switch 12. The latter then closes to complete a shunt circuit for the resistor 9, and the motor is thereby accelerated.

The cam shaft 21, which is actuated by the motor 3, effects the closing of switch 18 when the motor has rotated through an angle of approximately 15°. The switch 18 closes a shunt circuit for the switch 19 which opens almost immediately after the closing of the switch 18. The switch 18 prevents the opening of the circuits normally controlled by the switch 19, with the exception of that comprising the coil 44 of relay 22. The relay 22 then opens, but the circuit of coil 17 of the line switch is maintained by the switch 18.

When the motor has rotated through approximately 120° of its path of movement, the switch 20 closes to complete a shunt circuit for a portion of a shunt field resistor 51 which may be, for example, the usual adjustable field rheostat employed in connection with electric motors. The effect of shunting the resistor is to increase the field excitation of the motor and cause it to rotate more slowly during that portion of its path of travel in which the crank arm 39 for controlling the position of the small bell 37 is approximately in its uppermost position to effect the lowering of the small bell 37.

The object of this variation in speed of the motor is to maintain the small bell in its open position throughout a considerable portion of the operation of the motor in order to insure that there may be ample time for the material in the hopper above the bell to be discharged into the chamber below. When the motor has traversed approximately 240° of its path of movement, the switch 20 is opened by the cam mechanism 21 and the motor again operates at its normal speed to effect the closing of the small bell 37.

Just before the motor reaches the end of its path of travel, the switch 18 opens and the switch 19 closes. The opening of the switch 18 opens the circuit of the actuating coil 17 of the line switch 13 and the latter opens to break the circuit of the motor 3 and to close a dynamic braking circuit which extends from the motor armature through switch member 15 and a portion of the sectional resistor 9 to the other terminal of the motor armature. The motor 3 is, by this means, quickly brought to rest. The closing of switch 19 arranges the circuits in readiness for the succeeding starting operation.

When the circuit of the motor 3 is closed, a circuit is, at the same time, completed for the pilot motor 30. This circuit extends from the line conductor 1 through conductor 52, switch 53, field-magnet winding and armature of pilot motor 30, switch 32, conductor 54, coil 47, and switch member 15, to line conductor 2. When the pilot motor 30 rotates to actuate the switch arm 28, the cam mechanism 34 operated by the motor 30 effects the closing of switch 33 and opens switch 32. The latter is, however, actuated into operative relation to an electromagnet 55 which retains the switch 32 in its open position as long as current traverses its energizing coil.

The cam mechanism operates to open switch 33 when the switch arm 28 is in approximately a mid-position relatively to a pair of stationary contact members 27. The switch 32 remains in its open position until the circuit of its energizing coil is broken by the opening of line switch 13. Each operation of the pilot motor actuates the switch arm 28 from a mid-position between the contact members, as illustrated, to the succeeding similar position.

The arm 28 will therefore engage one of the contact members 27 upon each actuation of the motor 30 and come to rest in an inoperative position. If the switch 29 for controlling the circuit of that contact member 27 which has been engaged by the arm 28 is open, no circuit is completed by the arm 28 and the mechanism for controlling the motor 4 is not actuated. The motor 3 is operated through a cycle similar in all details to that described above upon the succeeding operation of the contact segment 25 to close the circuit controlled by it. The pilot motor 30 again operates the switch arm 28 to a succeeding position. If, however, the arm 28, during its movement from one position to another, engages a contact member 27 that is connected in circuit by the corresponding switch 29, a circuit is established which extends from line conductor 2 through the switch 29, contact member 27, contact arm 28, switch 53, conductor 57, relay coil 58, switch 19 and field protective relay 42 to line conductor 1.

The relay 22 associated with the motor 4 is then closed to partially complete a circuit for the actuating coil 17 of the line switch 13 for controlling the circuit of the motor 4. This circuit cannot be closed, however, as long as the line switch 13 for the motor 3 is in its closed position in which the corresponding interlock 16 opens the circuit of the coil 17. When, however, the circuit of the motor 3 has been opened in the manner above described, the interlock 16 completes the circuit of the coil 17 and the line switch 13 of the motor 4 is closed.

The line switch 13 of the motor 4 closes to complete a circuit for the motor which extends from line conductor 1 through switch member 14, armature 6, resistor 9, coil 47 and switch member 15, to line conductor 2. The accelerating switches 10, 11 and 12 then close in order to complete a shunt circuit for the starting resistor 9 in the manner described above in connection with the motor 3. The operation of the motor 4 through its cycle and the operation of the cam-controlled switches 18, 19 and 20 are similar in every respect to that described in connection with the motor 3. The large bell 38 is lowered by the motor 4 and allowed to remain in its open position during the greater portion of the time occupied by the motor in completing its cycle.

If the movable contact segment 25 that is operatively connected to the skip-hoist mechanism completes the circuit controlled by it before the motor 4 has come to rest, the coil 44 of relay 22 is energized to close the latter and thus partially complete the circuit of coil 17 of line switch 13 of the motor 3. The circuit is not completed, however, because the line switch 13 of the motor 4 is in its open position and the interlock 16 that is connected thereto controls the circuit of the line switch 13 of the motor 3. Upon the closing of the interlock 16, the line switch 13 of the motor 3 closes, and the small bell is operated in the manner above set forth.

The above operations continue automatically during such time as the various manually operable switches remain in their respective illustrated positions and current is supplied to the line conductors 1 and 2. The number of operations of the motor 3 occurring before one operation of the motor 4 is controlled in accordance with the adjustment of the switches 29 of the sequence switch 26, as will be readily understood.

In order to render the system non-automatic, the switches 45 and 53 are respectively actuated to their lower and left-hand positions. The circuit controlled by the movable contact segment 25 is then broken and the operation of the motor 3 is controlled by a push button 59 which is in the circuit of the coil 44 of the relay 22. The switch 53 opens the circuit of the pilot motor 30 and the latter is rendered inoperative to actuate the movable switch arm 28. The operation of the large bell motor 4 is similarly controlled by a push button 60. The operation of the motors may now be controlled entirely in accordance with the desires of the operator. The actuation of the push button 59 causes the small-bell motor 3 to operate through its cycle, and the actuation of push button 60 causes a similar operation of the large-bell motor 4. Simultaneous operation of the motors is prevented, as before, by means of the interlocks 16.

It is necessary to retain the push button 59 in its closed position only momentarily, since the closing of switch 46 connected to the relay 22 shunts the push button 59 and establishes a circuit for the relay coil 44. The switch 46 that is controlled by the relay coil 58 performs a similar function for the push button 60. Signal lamps 61, which may be mounted on the control board or other place convenient to the operator, indicate the operation of the motors 3 and 4 and the pilot motor 30.

Reference may now be had to Fig. 3 in which a modification of my invention is illustrated, similar numerals being employed to designate corresponding parts. The motors 3 and 4 are provided with sectional starting resistors 9, as in the arrangement of Fig. 1, which are controlled by magnetically operable switches 62 and 63. The circuits of the motors are controlled by line switches 64 having actuating coils 65.

A switch member 66, which is mechanically connected to each of the line switches 64, controls a dynamic braking circuit for each of the motors. The circuit of the actuating coil 65 of the line switch 64 of the motor 3 is controlled by a manually operable double-throw switch 67, which also controls the operation of a skip hoist or other conveying mechanism (not shown), and by switches 68 and 69. The switches 68 and 69 are controlled by a cam mechanism 70.

The shaft of the cam mechanism 70 is operatively connected to the armature shaft of the motor 3 by a suitable gear mechanism which causes the shaft of the cam mechanism to rotate at one-half the speed of the armature shaft. The cam mechanism 70 also controls a pair of switches 71 and 72 which operate respectively in synchronism with switches 68 and 69. The cam mechanism is arranged to operate the respective pairs of switches at intervals of 180° in the circular path of movement of the motor 3.

The switches 71 and 72 control the circuit of the pilot motor 30 for operating the sequence switch 26. The circuit of the motor 30 comprises a manually operable double-throw switch 73 and limit switches 74 and 75 which are operatively connected to the motor 30 by a cam mechanism 76. The mechanism for controlling the switches 74 and 75 is illustrated in Fig. 4. The energizing circuit of the line switch 64 of the motor 4 is controlled by a relay 77.

The energizing circuit of the relay 77 is controlled by a push button 78, the latter being shunted by a relay 79 mechanically connected to the relay 77, when the latter closes. The energizing circuits of the line switch 65 and the relay 77 are respectively controlled by limit switches 80 and 81 that are controlled by a cam mechanism 82 operatively connected to the armature shaft of the motor 4. The cam mechanism 82 is illustrated in Fig. 5.

It may be assumed that the various parts occupy their respective positions as illustrated and that it is desired to operate the motor 3 to open the small bell 37. The switch 67 is actuated to the left to its neutral or inoperative position to effect the operation of the skip-hoist mechanism and to partially complete a circuit for the actuating coil 65 of line switch 64. This circuit is open, however, at a switch 83 that is controlled by a cam mechanism operatively connected in any suitable manner to the skip-hoist mechanism. The latter arrangement is provided to insure that the motor 3 cannot be operated until the skip-hoist mechanism has moved through a predetermined distance. When the switch 83 is closed, the coil 65 is energized to close the line switch 64 and thereby complete a circuit for the motor 3.

The motor circuit extends from line conductor 1 through line switch 64, armature 5, resistor 9, and series actuating coil 86 to line conductor 2. The switch 62 is closed, upon the energizing of coil 86, to complete a shunt circuit for a portion of the resistor 9 through the series actuating coil 85 of switch 63. The latter then closes to complete a shunt circuit for the resistor 9, and the motor operates at normal speed to complete one revolution, during which time the small bell 37 is lowered and raised again to its illustrated position.

When the motor 3 has rotated through an angle of approximately 355°, the switch 68 is opened by the cam mechanism 70, and the switch 69 is closed. The opening of switch 68 breaks the circuit of the coil 65, and the line switch 64 opens to break the circuit of the motor 3. At the same time, the switch member 66 establishes a dynamic braking circuit for the motor through a dynamic braking resistor 84. The motor is quickly brought to rest with the bell 37 in its closed position.

In order to again effect the operation of the motor 3, it is necessary to actuate the switch 67 to its right-hand position because the switch 68 is now open and the switch 69 is closed. The switches 71 and 72 are also open and closed, respectively. When the switch 73 and the limit switches 74 and 75 are in their illustrated positions, the circuit of the pilot motor 30 is completed when the switch 72 is closed. This circuit extends from a line conductor 1 through switch 72, switch 73, limit switch 74, and pilot motor 30 to line conductor 2. The pilot motor 30 then operates to actuate movable arm 28 from a position corresponding to that illustrated to a similar position midway between the succeeding pair of contact members 27. The pilot motor 30 is brought to rest by the limit switch 74 which opens the motor circuit at the proper time. The limit switch 75 is also closed, but the circuit of the pilot motor is not again completed until the motor 3 has operated to rotate the shaft of the cam mechanism 70 through an angle of substantially 180° to close switch 71 and to open switch 72.

Normally, the limit switch 80 for controlling the circuit of the motor 4 is open and the limit switch 81 is closed. When the movable arm 28 engages a contact member that is connected in circuit by its corresponding switch 29, the energizing circuit of relay 77 is closed through a circuit extending from the line conductor 1 through limit switch 81, actuating coil of relay 77, arm 28, contact member 27 and switch 29 to line conductor 2. The relay 77 then closes to complete a circuit for the actuating coil 65 of line switch 64 and the latter closes to complete the circuit of the motor 4.

The accelerating switches 62 and 63 operate, in the manner described above in connection with the motor 3, to shunt the starting resistor 9 and the motor 4 operates to successively lower and raise the large bell 38. When the motor 4 has traversed a relatively small portion of its path of movement, the limit switch 80 is closed to maintain the circuit of the coil 65, and the limit switch 81 is opened substantially simultaneously therewith to effect the opening of relay 77. When the motor 4 has nearly completed a revolution, the switch 80 is opened and the switch 81 is closed to restore these parts to their normal positions. The opening of limit switch 80 causes line switch 64 to open the circuit of the motor 4, and the switch member 66 closes a dynamic braking circuit to bring the motor 4 to rest.

When it is desired to render the motor 30 inoperative, the switch 73 is thrown to its neutral or inoperative position. If it is desired to operate the motor 30 when the circuit of the latter is open at one of the limit switches, the switch 73 is thrown to its opposite position, whereupon the circuit of the motor 30 is completed through the other limit switch which is closed.

The operation of the motor 4 may be controlled by the push button 78 which operates to establish the energizing circuit of the relay 77 through the limit switch 81 which is normally closed. When the relay 77 closes, the relay 79, which is mechanically connected thereto, closes a shunt circuit for the push button, and the latter may then be released. The motor 4 then operates in the manner previously described in connection with the control of its circuit by the sequence switch 26.

The arrangement shown in Fig. 3 corresponds in many particulars to that illustrated in Fig. 1. It differs, however, in that the mechanism required for manual control may be simpler than that for automatic control.

It will be noted that, in each of the above described arrangements for controlling a pair of electric motors, any desired combination of operations of the several motors may be arranged by suitably adjusting the sequence switch 26. The only limitation upon the combination is that the total number of operations of the small-bell motor in any desired combination must equal the number of stationary contact members of the sequence switch 26. For example, in the mechanism, as illustrated, the sequence switch is provided with ten stationary contact members which coact with the movable arm. It will be possible, therefore, to arrange a cycle of operations of the motors during which ten operations of the motor 3 occur. The number of operations of the motor 4, which occur between successive operations of the motor 3, may vary from zero to 10, depending on the adjustment of the several switches 29.

While I have shown and described specific embodiments of my invention, many changes may occur to those skilled in the art to which my invention appertains, and it is understood that such changes may be made as fall within the scope of the appended claims without departing from the spirit of my invention.

I claim as my invention:

1. The combination with a controller and an actuating motor therefor, of an electromagnetically controlled switch, a limit switch for controlling the circuit of said motor, and means controlled by said motor for successively closing said limit switch, opening said electromagnetically controlled switch and opening said limit switch.

2. The combination with a controller and an actuating motor therefor, of a plurality of switches for controlling the circuit of said motor, an electromagnet for retaining one of said switches in an open position, and means actuated by said motor for successively closing a second of said switches, opening the electromagnetically controlled switch and opening the second switch.

3. The combination with a plurality of main motors and means for selectively controlling the operation of said motors, of a pilot motor for actuating said controlling means, a switch for controlling said pilot motor, an electromagnet in circuit with one of said motors for controlling said switch, a limit switch for said pilot motor, and means actuated by said pilot motor for controlling said switches.

4. The combination with a switching device and an actuating motor therefor, of a switch for controlling the circuit of said motor, an electromagnet for retaining said switch in an open position, and means controlled by said motor for actuating said switch to its open position to be retained by said electromagnet.

5. The combination with a switching device and an actuating motor therefor, of a switch for controlling the circuit of said motor, an electromagnet for retaining said switch in an open position, means controlled by said motor for actuating said switch to its open position to be retained by said electromagnet and means for de-energizing said electromagnet when the motor reaches a predetermined point in its path of travel.

6. The combination with an electric motor and a pair of switches for separately controlling the circuit of said motor, one of said switches being normally closed and said other switch being normally open, of means for automatically closing said normally open switch and for opening said normally closed switch, means for maintaining said normally closed switch open and means for opening said normally open switch at a predetermined point in the operation of said motor.

7. The combination with an electric motor, of a controlling mechanism therefor comprising a series of contact members, a contact member coacting therewith, means cooperating with said coacting contact for controlling the circuit of said motor, and means for automatically actuating said coacting contact member from a position of rest between two of said contact members to a similar position beyond the succeeding contact member.

8. The combination with a controlling device having a series of contact members, and a movable member coacting therewith, of means for periodically actuating said movable member from an inoperative position between two of said contact members to the succeeding similar position.

9. The combination with an electric motor and a switch for closing the circuit of said motor and having an actuating coil, of a relay for closing the circuit of said coil and having an actuating coil, a temporarily operable switch for closing the circuit of said relay coil, a switch mechanically connected to said relay for maintaining the circuit of said relay coil closed, a switch controlled by said motor for opening the circuit of said relay coil and a switch controlled by said motor for maintaining the circuit of said switch coil closed.

10. In a furnace-charging system, the combination with a large bell and actuating means therefor, of a single movable contact member having a plurality of positions, a stationary contact member corresponding to each of said positions, an electrical circuit connected to each of said stationary contact members for controlling said actuating means and a switch in each of said circuits.

11. In a furnace-charging control system, the combination with a large bell and actuating means therefor, of a sequence switch comprising a single movable contact member and a plurality of coacting stationary contact members and a plurality of independently operable switches for respectively controlling successive operations of the bell.

12. In a furnace-charging control system, the combination with a small and a large bell and actuating means therefor, of a sequence switch comprising a single movable contact member and a plurality of coacting stationary contact members and a plurality of independently operable switches for determining the sequence of operation of said bells.

13. In a furnace-charging control system, the combination with a small bell and a large bell and actuating means therefor, of a sequence switch comprising a plurality of stationary contact members and a single movable contact member actuated with the small bell for effecting the operation of the large bell subsequent to any desired number of operations of the small bell within predetermined maximum and minimum limits.

14. In a furnace-charging control system, the combination with a small and a large bell and actuating means therefor, of a sequence switch comprising a plurality of stationary contact members and a single movable contact member actuated with the small bell for controlling the large bell, and a plurality of independently operable switches respectively in circuit with said stationary contact members for predetermining the effect of the sequence switch.

15. In a furnace-charging control system, the combination with a large bell and actuating means therefor, of a sequence switch operative in a predetermined cycle, said sequence switch comprising a plurality of stationary contact members and a single movable contact member and a plurality of independently operable switches respectively in circuit with said stationary contact members for predetermining the number of operations of the large bell for one cycle of operation of the sequence switch.

In testimony whereof, I have hereunto subscribed my name this 30th day of March, 1916.

HENRY D. JAMES.